United States Patent [19]

Beck

[11] Patent Number: 5,450,829
[45] Date of Patent: Sep. 19, 1995

[54] ELECTRONICALLY CONTROLLED PILOT FUEL INJECTION OF COMPRESSION IGNITION ENGINES

[75] Inventor: Niels J. Beck, Bonita, Calif.

[73] Assignee: Servojet Products International, San Diego, Calif.

[21] Appl. No.: 237,445

[22] Filed: May 3, 1994

[51] Int. Cl.$^6$ .............................................. F02M 7/00
[52] U.S. Cl. .................................................. 123/435
[58] Field of Search ................. 123/435, 525, 276 E, 123/577, 477, 67, 27, 90.13; 239/96; 364/431.08

[56] References Cited

U.S. PATENT DOCUMENTS

| | | | |
|---|---|---|---|
| Re. 33,270 | 7/1990 | Beck | 123/447 |
| 2,985,378 | 5/1961 | Falberg | 239/96 |
| 4,520,766 | 6/1985 | Akeroyd | 123/27 |
| 4,597,364 | 7/1986 | Young | 123/67 |
| 4,637,353 | 1/1987 | Codrington | 123/27 |
| 4,742,801 | 5/1988 | Kelgard | 123/27 |
| 4,831,993 | 5/1989 | Kelgard | 123/525 |
| 5,140,955 | 8/1992 | Sono et al. | 123/90.13 |
| 5,339,245 | 8/1994 | Hirata et al. | 364/431.08 |
| 5,359,518 | 10/1994 | Wimmer | 123/435 |
| 5,359,975 | 11/1994 | Katashiba et al. | 123/435 |

OTHER PUBLICATIONS

Paul R. Danyluk, Coltec Industries, Fairbanks Morse Eng. Division, *Development of a High Output Dual Fuel Engine*, Jan. 31–Feb. 4, 1993.

*Primary Examiner*—Raymond A. Nelli
*Attorney, Agent, or Firm*—Nilles & Nilles

[57] ABSTRACT

An electronic control system controls pilot fuel injection quantity and timing to optimize primary fuel charge ignition. The system includes sensors monitoring engine operating conditions such as engine speed, power demand, intake air temperature, intake manifold pressure, knock, exhaust EGO concentration levels, fuel quality, etc., and a controller which is responsive to these sensors to actuate an electronically controlled pilot fuel injector to adjust pilot fuel injection timing and quantity as required for optimum primary charge ignition. The pilot fuel injector is preferably controlled such that pilot injection quantity is ordinarily increased with increases in air/fuel ratio and charge density and with decreases in engine speed and such that injection timing is ordinarily advanced with increases with engine speed and air/fuel ratio and with decreases in charge density. The controller is usable with virtually any gaseous fuel supply device and with both mechanically and hydraulically actuated electronically controlled pilot fuel injectors operating both with and without a prechamber.

20 Claims, 3 Drawing Sheets

ELECTRONICALLY CONTROLLED PILOT FUEL INJECTION OF COMPRESSION IGNITION ENGINES

BACKGROUND OF THE INVENTION

1. Field of the Invention

The invention relates to compression ignition engines and, more particularly, relates to a method and apparatus for electronically controlling the injection of pilot fuel into such an engine.

2. Discussion of the Related Art

Recent years have seen an increased demand for the use of gaseous fuels as a primary fuel source in compression ignition engines. Gaseous fuels such as propane or natural gas are considered by many to be superior to diesel fuel and the like because gaseous fuels are generally less expensive, provide equal or greater power with equal or better mileage, and produce significantly lower emissions. This last benefit renders gaseous fuels particularly attractive because recently enacted and pending worldwide regulations may tend to prohibit the use of diesel fuel in many engines. The attractiveness of gaseous fuels is further enhanced by the fact that existing compression ignition engine designs can be readily adapted to burn gaseous fuels.

One drawback of gaseous fuels is that they exhibit significantly higher ignition temperatures than do diesel fuel, oil, and other liquid fuels traditionally used in compression ignition engines so that the temperature of gaseous fuels does not increase sufficiently during operation of standard compression ignition engines for self-ignition. This problem is overcome by injecting limited mounts of pilot fuel, typically diesel fuel, into the cylinders of the engine in the presence of a charge of a compressed gaseous fuel/air mixture in the combustion chamber. The pilot fuel ignites upon injection and burns at a high enough temperature to ignite the gaseous fuel charge.

The ignition characteristics of gaseous fuels vary markedly with engine operating conditions. For instance, changes in air/fuel ratio and density in the combustion chamber, occurring with changes in engine load, affect the combustion characteristics of the charge in the combustion chamber. Relatively lean charges (those exhibiting a high air/fuel ratio) are more difficult to ignite and take longer to burn than relatively rich charges (those exhibiting a relatively low air/fuel ratio). Relatively lean charges thus require that greater quantities of pilot fuel be injected at an advanced timing to obtain optimum primary fuel ignition, wherein "optimum" ignition is understood to those skilled in the art to achieve a desired balance of efficiency, power, and emissions. Injection characteristics are also affected by engine speed because ignition delays occurring during any combustion event have a greater impact at high engine speeds than at low engine speeds. These problems could be at least partially alleviated by always injecting sufficient pilot fuel to assure adequate primary fuel charge ignition, even under worst-case conditions. This solution is, however, undesirable because pilot fuel combustion produces undesired emissions the production of which should be minimized.

The above problems have not been sufficiently addressed by prior art pilot injection systems the injectors of which typically vary neither pilot fuel injection quantity nor timing. Those control schemes which have been proposed to alleviate these problems have met with only partial success. For instance, a method has been proposed in U.S. Pat. No. 4,831,993 to Kelgard (the Kelgard patent) to vary pilot injection timing. However, the method proposed in the Kelgard patent varies timing only with engine speed and does not vary injection quantity at all and thus has at best a limited impact on primary charge ignition and pilot charge optimization.

OBJECTS AND SUMMARY OF THE INVENTION

It is therefore an object of the invention to minimize the quantity of pilot fuel required for optimal ignition of gaseous fuels in compression ignition engines.

Another object of the invention is to provide a method of the type described above which is responsive to marked changes in engine speed and operating conditions.

In accordance with a first aspect of the invention, these objects are achieved by providing a method including inducting a gaseous charge of an air/fuel mixture into the combustion chamber of a cylinder of an internal combustion engine, determining and controlling properties of the charge, and injecting pilot fuel into a zone communicating with the combustion chamber. Optimization of pilot fuel injection is made possible by varying, based upon the determining step, at least one of the quantity and timing of pilot fuel injection.

Preferably, the determining step comprises calculating the quantity of the charge, the air/fuel ratio of the charge, and a value indicative of the density of the charge. Data making this determination possible is obtained by sensing the speed of the engine, the pressure within the intake manifold, the temperature within the intake manifold, and a quantity of gaseous fuel supplied to the inlet passage.

Although a variety of control schemes are possible, optimization typically includes adjusting pilot fuel injection quantity and/or adjusting injection timing in the presence of changes in at least one of (1) a change in engine speed, (2) a change in the air/fuel ratio of the charge, and (3) a change in the charge density. Primary charge ignition can be optimized still further by monitoring at least one of knock level, exhaust gas oxygen concentration level, and gaseous fuel hydrogen/carbon ratio and varying pilot fuel injection timing based upon the monitoring step.

Yet another object of the invention is to provide an electronically controlled pilot fuel injection system for a compression ignition engine which supplies the minimum amount of pilot fuel required for optimal main fuel charge ignition over a wide range of engine operating conditions and speeds.

In accordance with another aspect of the invention, this object is achieved by providing a pilot fuel injection system comprising an electronic fuel injector having a nozzle communicating with the combustion chamber and means for controlling operation of the pilot fuel injector. The means for controlling includes means for sensing the speed of the engine, means for determining properties of a fuel charge formed from a gas/air mixture in the combustion chamber, and means (preferably a microprocessor), responsive to the means for sensing and means for determining, for varying at least one of (a) the quantity of fuel injected from the pilot fuel injector and (b) the timing at which the quantity of fuel is injected from the pilot fuel injector.

Preferably, the means for determining determines the air/fuel ratio of the charge and a value indicative of the density of the charge, and the means for controlling controls the pilot fuel injector to adjust injection timing and/or injection quantity in the presence of at least one of (1) a change in engine speed, (2) a change in the air/fuel ratio of the charge, and (3) a change in charge density.

Other objects, features, and advantages of the invention will become apparent to those skilled in the art from the following derailed description and the accompanying drawings. It should be understood, however, that the detailed description and specific examples, while indicating preferred embodiments of the present invention, are given by way of illustration and not of limitation. Many changes and modifications could be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

1. Resume

Pursuant to the invention, an electronic control system is provided which controls pilot fuel injection quantity and timing to optimize primary fuel charge ignition using a minimum of pilot fuel. The system includes sensors monitoring engine operating conditions such as engine speed, intake air temperature, intake manifold pressure, knock, EGO concentration levels, fuel quality, etc., and a controller which is responsive to these sensors to actuate an electronically controlled pilot fuel injector to adjust pilot fuel injection timing and quantity as required for optimum primary charge ignition. The pilot fuel injector is preferably controlled such that pilot injection timing is ordinarily advanced with increases in air/fuel ratio and engine speed and such that injection quantity is ordinarily increased with decreases in engine speed and with increases in air/fuel ratio and air/fuel density. The controller is usable with virtually any gaseous fuel supply device and with both mechanically and electronically actuated electronically controlled pilot fuel injectors operating both with and without a prechamber.

2. System Construction

Figure 1:
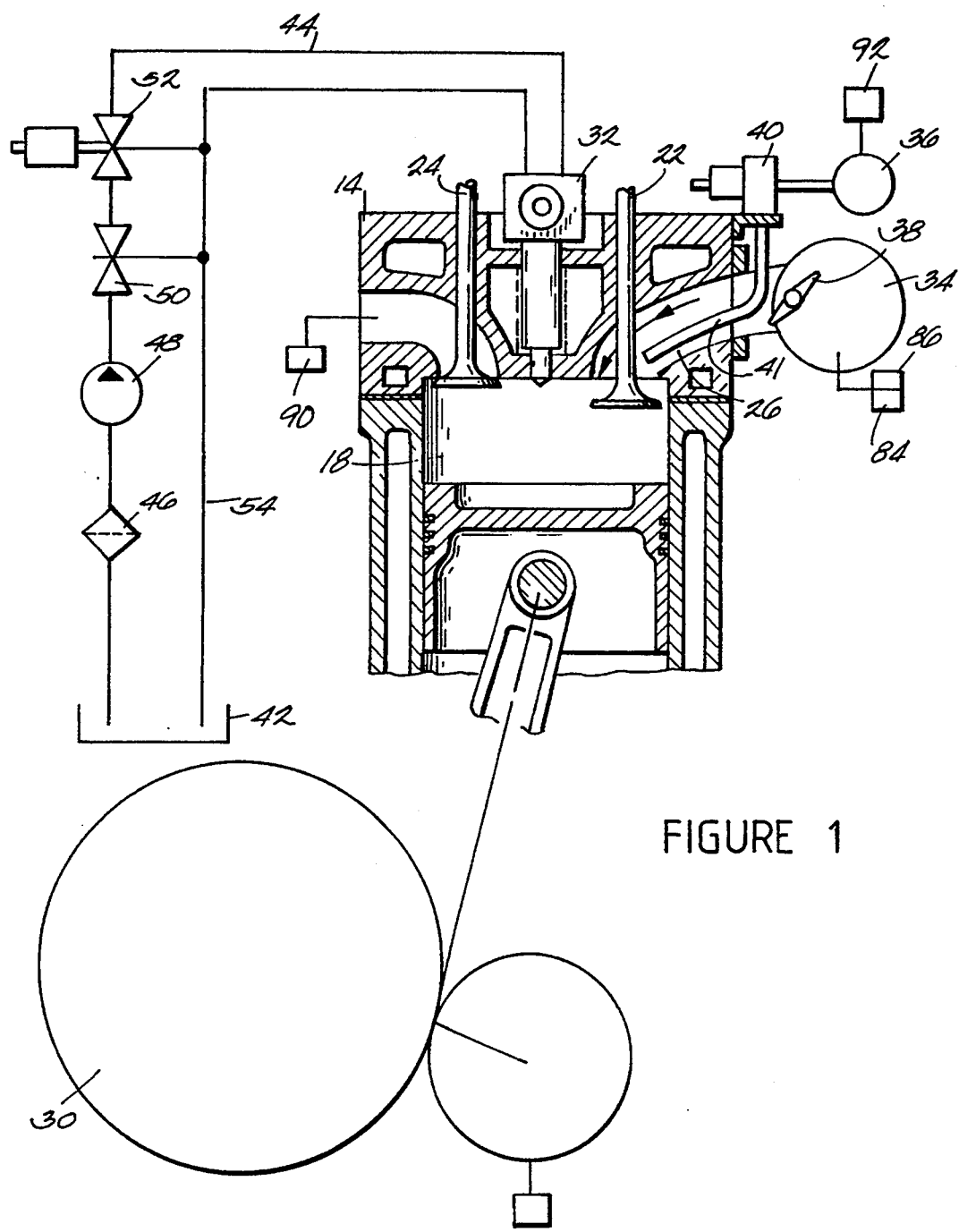
FIG. 1 is a schematic partially cross-sectional view of a compression ignition engine constructed in accordance with a preferred embodiment of the invention.
Figure 2:
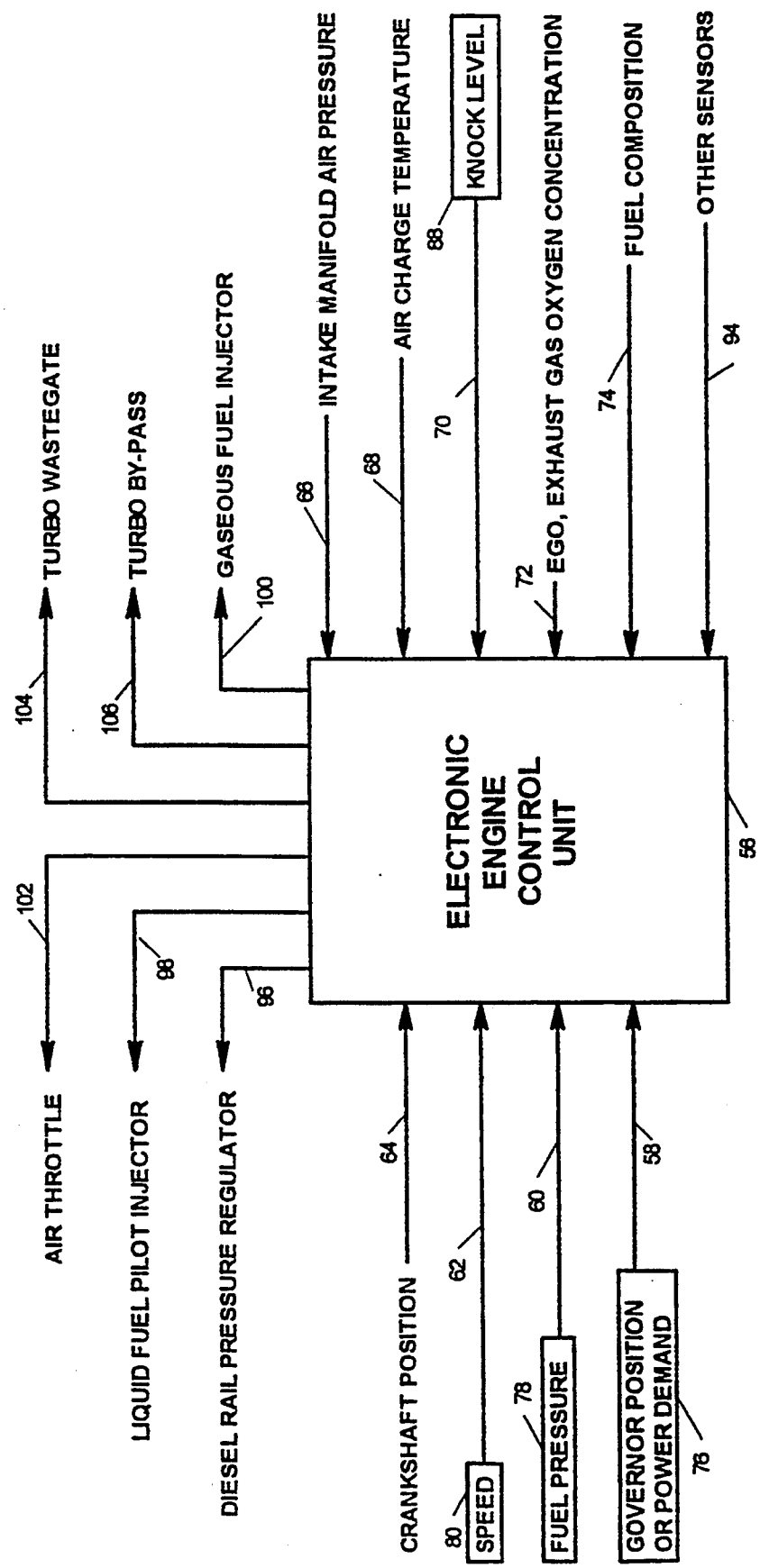
FIG. 2 is a control diagram of the engine of FIG. 1.

Referring now to the drawings and to FIG. 1 in particular, a compression ignition-type internal combustion engine 10 is illustrated having a plurality of cylinders 12 (only one of which is illustrated) each capped with a cylinder head 14. A piston 16 is slidably disposed in the bore of the cylinder 12 to define a combustion chamber 18 between the cylinder head 14 and the piston 16. Piston 16 is also connected to a crankshaft 20 in the conventional manner. Conventional inlet and exhaust valves 22 and 24 are provided at the end of respective passages 26 and 28 in the cylinder head 14 and are actuated by a standard cam shaft 30 so as to control the supply of a primary fuel charge to and the exhaust of combustion products from the combustion chamber 18. At least one electronic fuel injector 32 is mounted in the cylinder head 14 for supplying a pilot fuel to the combustion chamber 18 and is controlled by a controller 56 (FIG. 2).

The primary fuel charge is supplied to inlet passage 26 via manifolds 34 and 36 supplying air and gaseous fuel, respectively. Air may be supplied from the intake manifold 34 via a turbocharger, a supercharger, or by natural aspiration. A conventional butterfly valve 38 controls the airflow to the passage 26 from intake manifold 34. In addition, airflow into the intake manifold 34 can be modulated by adjusting the output of the turbocharger (not shown) by means of a wastegate, bypass, or other similar device.

Gaseous fuel could be supplied from manifold 36 via a single metering valve discharging into a single throttle body at the entrance of the manifold 34, or a mechanically controlled valve. The preferred embodiment employs multiple electronically controlled gaseous fuel injectors 40 (only one of which is illustrated). The illustrated injector 40 injects fuel directly into the inlet passage 26 via a line 41, but could inject fuel into the air intake manifold 34 as well.

The pilot fuel injector 32 could comprise any electronically controlled injector such as an electronically controlled mechanically actuated fuel injector and preferably takes the form of an electro-hydraulic fuel injector, more preferably a pressure intensified accumulator-type injector of the type disclosed in U.S. Reissue Pat. No. 33,270. Electro-hydraulic fuel injectors are particularly useful because the timing of injection can be controlled independently of engine speed and because the quality of spray injected therefrom is also relatively independent of engine speed. That is, a cam actuated injector produces an injection spray the pressure of which decreases with decreasing engine speed. Electro-hydraulic injectors, on the other hand, maintain maximum desired pressure independent of engine speed thereby maintaining fine dispersion and high atomization of spray. This same independence from engine speed can be achieved with (1) a non-intensified accumulator injector such as is described in U.S. Pat. No. 2,985,378 to Falberg, the disclosure of which is hereby incorporated by reference, or (2) a high pressure common rail injection system.

In the illustrated embodiment, the accumulator-type pilot fuel injector 32 is fed with diesel fuel or the like from a conventional tank 42 via a supply line or common rail 44. Disposed in line 44 are a filter 46, a pump 48, a high pressure relief valve 50, and a pressure regulator 52. A return line 54 also leads from the injector 32 to the tank 42.

The controller 56 may comprise any electronic device capable of monitoring engine operation and of controlling the supply of fuel to the engine 10 and, in the illustrated embodiment, comprises a programmable digital microprocessor or electronic control unit (ECU) 56. Controller or ECU 56 receives signals indicative of various engine operating conditions including governor position or other power demand 58, pilot fuel pressure 60, engine speed 62, crank shaft angle 64, intake manifold pressure 66, air charge temperature 68 (in intake manifold 34), knock level 70, exhaust gas oxygen (EGO) concentration level 72, and gaseous fuel composition 74 via respective sensors 76, 78, 80, 82, 84, 86, 88, 90, and 92 (some of which are schematically illustrated in FIG. 1 and others of which are denoted by appropriate boxes in FIG. 2). Gaseous fuel composition sensor 92 typically detects a hydrogen/carbon ratio and thus can be used to calculate the effective air/fuel ratio, octane number, flow coefficient, and other parameters. Other signal(s) 94 may be transmitted to controller 56 via other sensor(s) as may be required. Controller 56 receives these signals and transmits output signals 96, 98, and 100 for controlling the diesel rail pressure regulator 52, the pilot fuel injector 32, and the injector 40, respectively. Similar signals 102, 104, and 106 are used to control an air throttle, a turbo wastegate, and a turbo-bypass, respectively.

Pursuant to the invention, the controller 56 receives the various signals 58–74 and 94, performs calculations based upon these signals and upon other engine operating parameters such as the quantity of gaseous fuel supplied from injector 40, and controls the pilot fuel injector 32 to adjust pilot fuel injection quantity and timing to optimize gaseous fuel ignition using the optimum amount of pilot fuel. One possible control scheme will now be described.

3. System Operation

Figure 3:
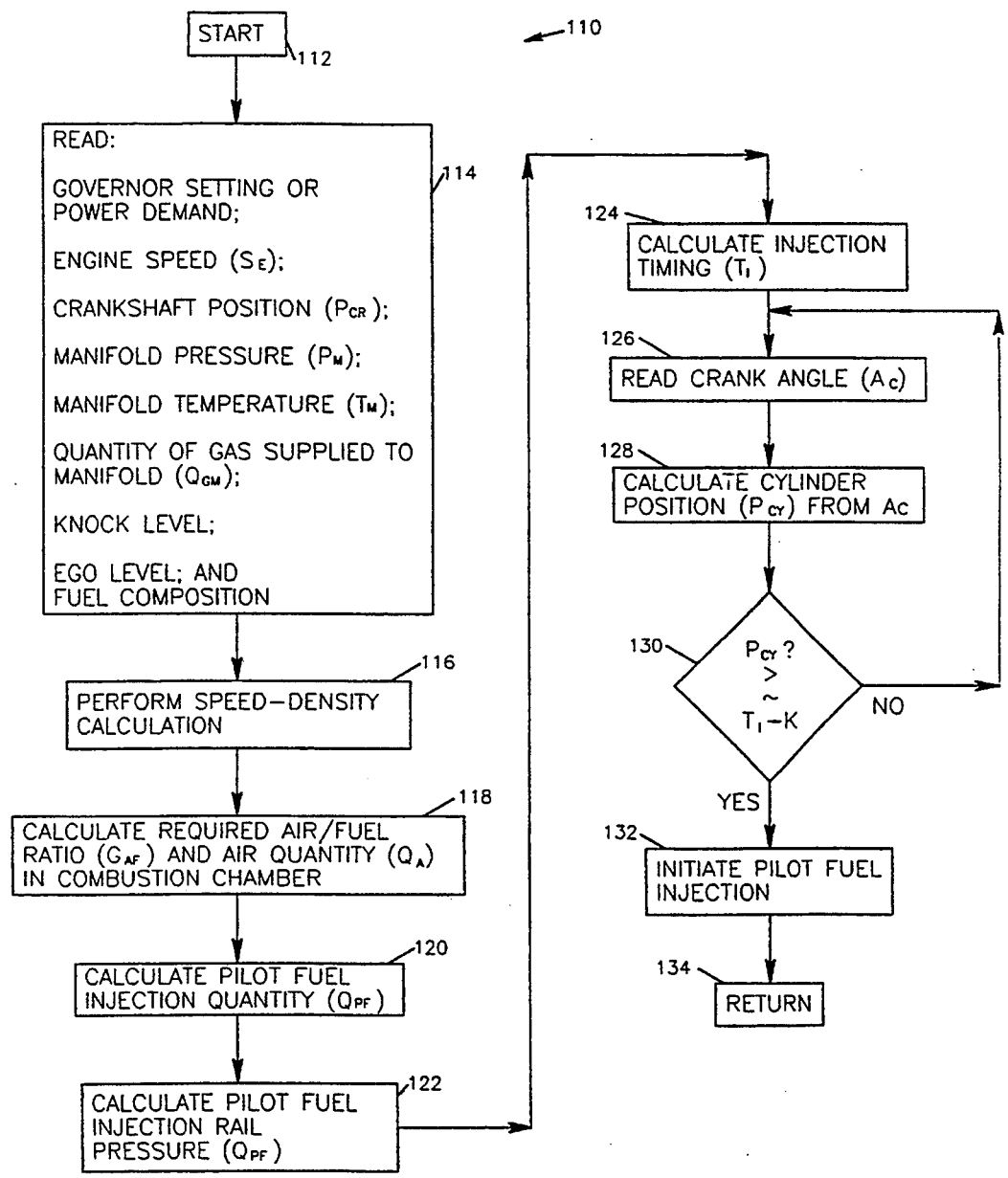
FIG. 3 is a flow chart illustrating a pilot fuel injection routine performed by the controller illustrated in the control diagram of FIG. 2.

Referring now to FIG. 3, controller 56 employs a routine 110 which proceeds from start at step 112 to read in step 114 power demand, engine speed $S_E$, crank angle or crankshaft position $P_{CR}$, intake manifold pressure $P_M$, air charge temperature $T_M$, knock level, exhaust $O_2$ concentration level, and fuel composition, the respective signals indicative of which are supplied from sensors as described above. Controller 56 also receives at this time a signal $Q_{GM}$ indicative of the quantity of gas supplied to passage 26 from the gaseous fuel injector 40. This value could be obtained via a sensor but, in the illustrated embodiment, is determined within the controller 56 and is received as an output from a separate subroutine used to control the injection of gaseous fuel from the gaseous fuel injector 40. Such a subroutine does not form part of the present invention and thus is not illustrated.

After receiving the required data in step 114, the routine 110 calculates optimal pilot injection quantity and timing for the prevailing engine operating conditions. Thus, assuming that it is determined in step 114 that the values of $S_E$, $P_M$, $T_M$, and $Q_{GM}$ are 2000 rpm, 2.0 atmospheres, 300° K and 100 mg, respectively, the routine 110 proceeds to step 116 and performs a speed-density calculation which is well-known to those skilled in the art and which involves the calculation of the density of the primary fuel charge in the combustion chamber 18 based upon the sensed engine speed, intake manifold pressure, and intake manifold temperature. These calculations are possible because the engine operating conditions can be assumed to be sufficiently steady-state to permit the determination of the properties of a particular charge in the combustion chamber 18 based upon the sensed properties of the constituents of the next charge to be inducted into chamber 18 from inlet passage 26.

Next, routine 110 proceeds to step 118 and determines, based upon the speed-density calculation of step 116 and upon the $Q_{GM}$ signal obtained in step 114, that the air/gaseous fuel mass ratio in the combustion chamber is 40 to 1 and that the quantity of air $Q_A$ in the combustion chamber is 4000 mg, thereby obtaining information about both the quality and density of the fuel charge in the combustion chamber. This calculation is also well known to those skilled in the art. Routine 110 then proceeds to steps 120–124 to determine pilot fuel quantity $Q_{PF}$ and pilot fuel injection timing $T_I$ using the information obtained in step 118. These values are determined empirically using suitable maps or look-up tables preprogrammed into the controller 56. The maps or look-up tables are designed to take into account the fact that fuels which burn lean, i.e., those having relatively high air/fuel ratios, are harder to ignite and burn slower than fuels which have low air/fuel ratios, and thus require higher quantities of pilot fuel for optimum ignition and also require that the timing of injection of such pilot fuel be advanced. Similarly, earlier injection is required at high engine speeds to compensate for the time duration of the combustion event. Pilot fuel injection quantity is also ordinarily increased and timing decreased with increases in fuel charge density (which is directly dependent upon the amount of air $Q_A$ in the combustion chamber) and should be set to maintain the desired ratio of air mass to the mass of both the liquid (pilot) and gaseous (primary) fuel such that denser charges require higher pilot fuel quantities than less dense charges.

Injection timing is additionally affected by the signals from the knock sensor 88 (detecting a knock sensitivity of the charge), EGO concentration sensor 90, and fuel composition sensor 92 such that timing is retarded as knock levels increase and advanced as exhaust gas oxygen concentration levels, or hydrogen carbon ratios (as calculated from the fuel composition data) increase. Detected knock levels are typically evaluated as being either "low", "medium", or "high" rather than being assigned numerical values. Oxygen concentration levels typically range from 1% to 15%, and hydrogen/carbon ratios typically range from 2.5–4.0. Timing adjustments based on these parameters could be made after injection timing $T_1$ is initially determined from the above maps or look-up tables or could be incorporated into the maps or look-up tables.

Thus, in the illustrated embodiment in which the engine speed $S_E$ is 2000 rpm, the air/fuel mass ratio $G_{AF}$ and quantity of air $Q_A$ in the combustion chamber are 40 to 1 and 4000 mg, respectively, and in which knock levels, EGO concentration levels, and gaseous fuel hydrogen/carbon ratios are all at "acceptable" levels not requiring adjustment of pilot fuel injection timing, the routine 110 determines in step 120 that the quantity of pilot fuel to be injected should be between 3 and 10 mg for open chamber pilot injectors of the type illustrated and 0.3 and 1.0 mg for prechamber pilot injectors. Since injection quantity is directly dependent upon rail pressure and/or injection pulse width (i.e., the width of the energizing pulse of the control valve), fuel injection quantity is controlled in step 122 by selecting a rail pressure that will provide the desired quantity and by transmitting an appropriate signal 96 to the diesel rail pressure regulator 52. In the illustrated example, the desired 3–10 mg quantity of fuel is injected by controlling rail pressure to assure that the desired 3–10 mg of fuel will be injected. Injection timing $T_I$ is then determined in step 124 using the above-mentioned maps and look-up tables and, in the illustrated example, is set to commence at 5° before top dead center (TDC).

Routine 110 then controls operation of the pilot fuel injector 32 to obtain the values obtained in steps 120 and 124 taking into account the physical characteristics of the system. Specifically, the instantaneous crank angle $A_C$ is read in step 126, and this crank angle is used to obtain cylinder crank angle position $P_{CY}$ in step 128 based upon the engine's firing order. A timing subroutine is then initiated in step 130 such that the routine 110 proceeds to step 132 only when it is determined that $P_{CY}$ has reached or exceeded the position $T_I$ minus an empirically derived constant K, where K compensates for delay times resulting from the physical response characteristics of the system. Once proceeding to step 132, routine 110 transmits a signal 98 to the pilot fuel injector 32 to initiate injection by de-energizing the solenoid valve, which then delivers a quantity of fuel predetermined by the rail pressure as set in step 122. The program then proceeds to return at step 134.

Many changes and modifications could be made to the invention without departing from the spirit thereof. For instance, although the invention has been disclosed in conjunction with an engine in which the pilot fuel injector injects fuel directly into the combustion chamber, a prechamber could also be employed so long as the nozzle of the fuel injector communicates at least indirectly with the combustion chamber such that fuel is injected into a zone communicating with the combustion chamber. Pilot fuels other than diesel fuel, for instance engine lube oil, could also be employed. Other changes and modifications falling within the scope of the invention will become apparent from the appended claims.

I claim:

1. A method comprising:
   (A) determining properties of a gaseous charge of a desired air/fuel mixture to be inducted into a combustion chamber of an internal combustion engine; then
   (B) determining an optimum quantity and an optimum timing of pilot fuel injection required for a desired ignition of the fuel in said gaseous charge;
   (C) controlling the properties of said gaseous charge;
   (D) inducting said gaseous charge into said combustion chamber;
   (E) injecting a designated quantity of pilot fuel into a zone communicating with said combustion chamber; and
   (F) varying, based upon said step (B), at least one of
       (1) the quantity of fuel injected in step (E), and
       (2) the timing at which fuel is injected in step (E).

2. A method as defined in claim 1, wherein said step (A) comprises calculating the quantity of said charge, the air/fuel ratio of said charge, and a value indicative of the density of said charge.

3. A method as defined in claim 2, wherein said inducting step comprises drawing air into an inlet passage of said cylinder from an intake manifold, and further comprising sensing
   (1) the speed of said engine,
   (2) the pressure within said intake manifold,
   (3) the air temperature within said intake manifold, and
   (4) a quantity of gaseous fuel supplied to said inlet passage.

4. A method as defined in claim 3, wherein said step (F) comprises increasing pilot fuel injection quantity in the presence of at least one of (1) a decrease in engine speed, (2) an increase in the air/fuel ratio of said charge, and (3) an increase in charge density.

5. A method as defined in claim 3, wherein said step (F) comprises advancing pilot fuel injection timing in the presence of at least one of (1) an increase in engine speed, and (2) an increase in the air/fuel ratio of said charge.

6. A method as defined in claim 3, wherein said inducting step further comprises injecting a gaseous fuel into said inlet passage from an electronically controlled fuel injector.

7. A method as defined in claim 1, further comprising monitoring at least one of knock level, exhaust gas oxygen concentration level, and gaseous fuel hydrogen/carbon ratio and varying pilot fuel injection timing based upon said monitoring step.

8. A method as defined in claim 1, wherein said injecting step comprises injecting said pilot fuel directly into said combustion chamber.

9. A method comprising:
   (A) selecting a controlled mixture of air to be supplied from an intake manifold of a compression ignition engine and forming a charge of a gaseous fuel/air mixture;
   (B) drawing said charge into a combustion chamber of said engine;
   (C) sensing
       (1) the speed of said engine,
       (2) the pressure within said intake manifold,
       (3) the air temperature within said intake manifold, and
       (4) a quantity of fuel supplied to said combustion chamber;
   (D) calculating
       (1) a value indicative of the density of said charge,
       (2) the air/fuel ratio of said charge, and
       (3) the knock sensitivity of said charge;
   (E) injecting a liquid pilot fuel into said combustion chamber;
   (F) varying the quantity of pilot fuel injected in step (E) based upon said sensing and calculating steps; and
   (G) varying the timing at which pilot fuel is injected in step (E) based upon said sensing and calculating steps.

10. A method as defined in claim 9, wherein said varying steps comprise adjusting pilot fuel injection timing and quantity to optimize ignition of gaseous fuel in said charge.

11. A pilot fuel injection system for a compression ignition internal combustion engine, said engine including (1) a cylinder having a combustion chamber disposed therein, and (2) a gaseous fuel supply device communicating with said combustion chamber, said system comprising:
    (A) an electronically controlled pilot fuel injector having a nozzle communicating with said combustion chamber; and
    (B) means for controlling operation of said pilot fuel injector, said means for controlling including
        (1) means for sensing the speed of said engine;
        (2) means for determining properties of a fuel charge formed from a gas/air mixture in said combustion chamber; and
        (3) means, responsive to said means for sensing and means for determining, for varying at least one of (a) the quantity of fuel injected from said pilot fuel injector and (b) the timing at which said quantity of fuel is injected from said pilot fuel injector.

12. A system as defined in claim 11, wherein said means for determining determines (1) the air/fuel ratio of said charge, and
(2) a value indicative of the density of said charge.

13. A system as defined in claim 12, wherein said means for controlling controls said pilot fuel injector to advance injection timing in the presence of at least one of (1) an increase in engine speed, and (2) an increase in the air/fuel ratio of said charge.

14. A system as defined in claim 12, wherein said means for controlling controls said pilot fuel injector to increase injection quantity in the presence of at least one of (1) a decrease in engine speed, (2) an increase in the air/fuel ratio of said charge, and (3) an increase in charge density.

15. A system as defined in claim 13, wherein said means for controlling comprises a microprocessor.

16. A compression ignition internal combustion engine comprising:
(A) a cylinder having a combustion chamber disposed therein;
(B) a gaseous fuel supply device communicating with said combustion chamber; and
(C) a pilot fuel injection system including
  (1) an electronically controlled pilot fuel injector having a nozzle communicating with said combustion chamber; and
  (2) means for controlling operation of said pilot fuel injector, said means for controlling including
    (a) means for sensing the speed of said engine;
    (b) means for determining properties of a charge of a gas/air mixture in said combustion chamber, and
    (c) means, responsive to said means for sensing and means for determining, for controlling the quantity of pilot fuel injected from said pilot fuel injector and the timing at which said quantity of fuel is injected from said pilot fuel injector.

17. A system as defined in claim 16, wherein said gaseous fuel supply device comprises a compressed natural gas fuel injector.

18. A system as defined in claim 16, wherein said pilot fuel injector comprises an accumulator-type electro-hydraulic fuel injector.

19. A system as defined in claim 18, wherein said pilot fuel injector comprises an intensified accumulator-type electro-hydraulic fuel injector.

20. A compression ignition internal combustion engine comprising:
(A) a cylinder having a combustion chamber disposed therein;
(B) an intake manifold communicating with said combustion chamber;
(C) an electronically controlled fuel injector having a nozzle communicating with said combustion chamber; and
(D) a diesel pilot fuel injection system including
  (1) an electro-hydraulic pilot fuel injector having a nozzle opening into said combustion chamber;
  (2) means for controlling operation of said pilot fuel injector, said means for controlling including
    (a) means for sensing the speed of said engine;
    (b) means for determining
      (i) the air/fuel ratio of a fuel charge formed from a gas/air mixture in said combustion chamber,
      (ii) a value indicative of the density of said charge, and
    (c) means for monitoring
      (i) engine knock level,
      (ii) exhaust gas oxygen concentration level, and
      (iii) gaseous fuel hydrogen/carbon ratio; and
  (3) means, responsive to said means for sensing, said means for determining, and said means for monitoring, for controlling the quantity of diesel fuel injected from said pilot fuel injector and the timing at which said quantity of diesel fuel is injected from said pilot fuel injector so as to optimize ignition of said charge, wherein
    (a) said means for controlling controls said pilot fuel injector to advance injection timing in the presence of at least one of (1) an increase in engine speed, (2) an increase in the air/fuel ratio of said charge, and (3) a decrease in charge density, (4) a decrease in engine knock levels, (5) an increase in exhaust gas oxygen concentration levels, and (6) an increase in gaseous fuel hydrogen/carbon ratios, and wherein
    (b) said means for controlling controls said pilot fuel injector to increase injection quantity in the presence of at least one of (1) a decrease in engine speed and, (2) an increase in the air/fuel ratio of said charge.

* * * * *